US012732474B2

(12) United States Patent
Stetzer et al.

(10) Patent No.: US 12,732,474 B2
(45) **Date of Patent: *Sep. 8, 2026**

(54) SYSTEM AND METHOD FOR IMPROVING DETECTION OF BAD CONTENT BY ANALYZING REPORTED CONTENT

(71) Applicant: Proofpoint, Inc., Sunnyvale, CA (US)

(72) Inventors: Mark Stetzer, Westfield, IN (US); Dharmin Shah, Indianapolis, IN (US); Kehkashan Sadiq Fazal, Indianapolis, IN (US); Remy Bubulka, Indianapolis, IN (US); Luis Blando, Sunnyvale, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 18/746,801

(22) Filed: Jun. 18, 2024

(65) Prior Publication Data

US 2024/0340260 A1 Oct. 10, 2024

Related U.S. Application Data

(63) Continuation of application No. 17/671,036, filed on Feb. 14, 2022, now Pat. No. 12,052,208.

(60) Provisional application No. 63/216,874, filed on Jun. 30, 2021, provisional application No. 63/200,352, filed on Mar. 2, 2021.

(51) Int. Cl.
*H04L 51/212* (2022.01)

(52) U.S. Cl.
CPC .................................. *H04L 51/212* (2022.05)

(58) Field of Classification Search
CPC ...................................................... H04L 51/12
See application file for complete search history.

(56) References Cited

U.S. PATENT DOCUMENTS

| | | | | |
|---|---|---|---|---|
| 7,668,951 | B2 * | 2/2010 | Lund | G06Q 10/107 709/204 |
| 8,091,129 | B1 * | 1/2012 | Emigh | H04L 51/212 726/22 |
| 10,819,744 | B1 * | 10/2020 | Higbee | H04L 63/1433 |
| 2009/0064323 | A1 * | 3/2009 | Lin | H04L 51/212 726/22 |
| 2010/0115040 | A1 * | 5/2010 | Sargent | H04L 51/42 709/206 |

(Continued)

*Primary Examiner* — Hee Soo Kim
(74) *Attorney, Agent, or Firm* — Sprinkle IP Law Group

(57) ABSTRACT

Systems, methods and products for increasing efficiency of resource usage by determining the reliability of reporters of unwanted messages and prioritizing evaluation of messages based on the reliability scores. Reports of unwanted messages are evaluated to determine whether they are bad. If an unwanted message is bad, a score for the reporter is updated to reflect a positive credit. A set of safe rules are applied to the message to determine whether it is safe and if the message is determined to be safe, the reporter score corresponding to the reporter is updated to reflect a non-positive (zero or negative) credit. If the message is determined to be neither bad nor safe, the message is entered in a reevaluation queue and, after a waiting period, the message evaluation is repeated using updated threat information, and the reporter score is updated according to the reevaluation.

19 Claims, 8 Drawing Sheets

(56) References Cited

U.S. PATENT DOCUMENTS

| | | | | |
|---|---|---|---|---|
| 2012/0246725 | A1* | 9/2012 | Osipkov | G06F 21/572 715/752 |
| 2015/0180896 | A1* | 6/2015 | Higbee | H04L 63/1466 726/25 |
| 2017/0206545 | A1* | 7/2017 | Gupta | H04L 51/212 |
| 2018/0191754 | A1* | 7/2018 | Higbee | H04L 63/1416 |
| 2019/0044975 | A1* | 2/2019 | Schafer | G06Q 10/107 |
| 2019/0364061 | A1* | 11/2019 | Higbee | G06F 21/00 |
| 2020/0067861 | A1* | 2/2020 | Leddy | G06F 21/6245 |

* cited by examiner

SYSTEM AND METHOD FOR IMPROVING DETECTION OF BAD CONTENT BY ANALYZING REPORTED CONTENT

This application is a continuation of, and claims a benefit of priority under 35 U.S.C. 120 of the filing date of U.S. patent application Ser. No. 17/671,036, filed Feb. 14, 2022, issued as U.S. Pat. No. 12,052,208, entitled "SYSTEM AND METHOD FOR IMPROVING DETECTION OF BAD CONTENT BY ANALYZING REPORTED CONTENT," which claims priority under 35 U.S.C. § 119(e) to U.S. Provisional Application No. 63/200,352, filed Mar. 2, 2021, entitled "SYSTEM AND METHOD FOR IMPROVING DETECTION OF MALICIOUS CONTENT BY ANALYZING REPORTED CONTENT," and U.S. Provisional Application No. 63/216,874, filed Jun. 30, 2021, entitled "SYSTEM AND METHOD FOR IMPROVING DETECTION OF BAD CONTENT BY ANALYZING REPORTED CONTENT", the entire contents of which are hereby expressly incorporated by reference for all purposes.

FIELD OF THE INVENTION

Embodiments of the present invention relate generally to cyberthreat security systems, and more particularly to systems and methods for determining reliabilities associated with reporters of unwanted messages.

BACKGROUND

Cyberthreat protection technologies are designed to protect enterprise computing networks from attacks and threats which originate from bad (e.g., malicious or otherwise suspicious) domains and/or IP addresses. For instance, a URL of a particular domain may be included in an email message in an attempt to phish the recipient, directing the recipient's browser to the malicious URL and potentially damaging the recipient's computing environment. Email messages may also be bad simply because they are "spam" or bulk emails that are of no particular use or interest to the recipients and therefore simply waste enterprise resources and users' time. It may therefore be desirable to prevent the delivery of these unwanted emails to the recipients' inboxes. For the purposes of this disclosure, "unwanted" will be used simply to refer to any emails or other messages or content that a user may choose to report. These emails may or may not be bad. "Bad" is used herein to refer to emails that a user or enterprise wishes to block, which may include malicious emails, as well as emails that may be undesirable but do not rise to the level of being malicious.

In order for a malicious content analytics service to be able to prevent delivery of unwanted emails, it is necessary for the system to be able to identify these emails. One way that this is done is for users to report received messages that are unwanted. When a user reports an unwanted email message, the malicious content analytics service can scan the message to determine whether it is malicious or is considered bad for some other reason (e.g., it may be spam) and should be blocked from being delivered to potential recipients.

One of the problems with user reporting of emails is that the reliability of the reporting may vary widely from one user to another. In other words, some users may consistently report emails that are confirmed to be bad and should be prevented from being delivered to recipients going forward, while other users may report emails that are most likely not bad and need not be blocked from delivery. When an unwanted email is reported by one of the reliable users who is good at identifying bad emails, the resources that are used to examine the unwanted email and to determine whether it is bad is well justified and is an efficient use of those resources. On the other hand, when an unwanted email is reported by one of the less reliable users, it is less likely that the email is actually bad, and the resources that are expended to determine whether the email is bad are more likely to be wasted.

It would therefore be desirable to be able to determine whether a user who reports an unwanted email is good or bad at identifying bad emails, so that resources can be prioritized and efficiently applied to the examination of unwanted emails that are likely to be found to be bad.

SUMMARY OF THE DISCLOSURE

Embodiments disclosed herein are designed to "score" the users who report suspicious messages to identify how good each user/reporter is at identifying/reporting bad messages. If they are very good at this, they get a "highly reliable" reporter score (and a lower score if they are bad). When users report messages, the messages are scanned to determine whether they are known to be bad, known to be safe, or their bad/safe character is "unknown." Unknown messages are sent to a queue to be reevaluated to determine whether they are bad/safe. This reevaluation may be delayed for some period (e.g., a day, a week or a month) to allow the evaluating system to be updated, which may increase the likelihood that the unknown message can be identified as either bad or safe. The unknown messages in the reevaluation queue are prioritized according to the reputation scores of the corresponding users/reporters with messages from more reliable users/reporters prioritized higher than less reliable users/reporters. The same type of message prioritization can be used to select messages for the initial scan/evaluation. As a result, the use of resources is more focused on messages that are more likely to be bad, which increases both the likelihood of identifying bad contents and the efficient utilization of resources.

One embodiment comprises a method including receiving a report of a first unwanted message, the report identifying the first unwanted message and a corresponding reporter and performing a message evaluation which includes scanning the first unwanted message and thereby determining whether the first unwanted message is bad. If the first unwanted message is determined to be bad, a reporting record corresponding to the reporter is updated to reflect a positive credit. Otherwise, it is determined whether the first unwanted message is safe. If the first unwanted message is determined to be safe, the reporting record corresponding to the reporter is updated to reflect a non-positive (zero or negative) credit. Otherwise (if the first unwanted message is not determined to be bad or safe), the first unwanted message is entered in a reevaluation queue. In response to entering the first unwanted message in the reevaluation queue, there is a delay for a waiting period (e.g., 30 days) and, after the waiting period has elapsed, the message evaluation is re-performed (repeated).

In some embodiments, the method includes maintaining a reporter table which contains a record for the report of each unwanted message, the record including a reporter identifier corresponding to the reporter who reported the unwanted message, and a message identifier corresponding to the unwanted message. The method may further include maintaining a message disposition table which contains a record for each reported unwanted message, the record including a message identifier corresponding to the unwanted message and a disposition of the unwanted message. The reporting record corresponding to the reporter may comprise a reporter score table which contains a record for the reporter who reported the unwanted message, the record including a reporter identifier for the reporter and a reliability score indicating the reliability of the reporter. The reporting record for the reporter may include an indicator of the number of reported unwanted messages reported by the reporter.

In some embodiments, the reevaluation queue contains a plurality of unwanted messages, including the first unwanted message. Each of the unwanted messages in the queue has a corresponding reporter associated with it, and each of the unwanted messages in the queue is prioritized according to the reporter score of the corresponding reporter. Thus, the one of the unwanted messages in the queue which has the highest priority is reevaluated before the ones of the unwanted messages having lower priorities. In some embodiments, the message reevaluation comprises performing a manual analysis of the unwanted messages, which may represent a scarce resource. With either automated or manual reevaluation, the prioritization of the unwanted messages in the reevaluation queue tends to allocate more resources for the reevaluation to messages reported by user/reporters having higher reliability scores.

In some embodiments, unwanted messages that are determined to be neither bad nor safe continue to be forwarded to the reevaluation queue for an indeterminate period of time. In some embodiments, an aging interval is applied during the re-performing of the message evaluation, so when the aging interval since receiving the report of the unwanted message has elapsed, the unwanted message is discarded. The method may alternatively limit the number of loops through the reevaluation process, where after the unwanted message has been entered in the reevaluation queue a predetermined number of times, the reevaluation process for the unwanted message is terminated and the unwanted message is discarded.

In some embodiments, determining that the first unwanted message is bad comprises determining that the first unwanted message is associated with one of a plurality of categories. The categories of bad behavior may include, for example, malicious, suspicious, bulk, low-risk, and spam. In some embodiments, the method may include maintaining a weighting factor corresponding to each of the categories, where the positive credit that is applied to a reporter's score may be generated based on the determined category of the unwanted message and the corresponding weighting factor.

One alternative embodiment comprises a system having a processor and a memory storing instructions for carrying out a method substantially as described above. Another alternative embodiment comprises a computer program product embodying instructions for carrying out a method substantially as described above. Still further alternative embodiments will be apparent to those of skill in the art upon reading this disclosure.

Embodiments disclosed herein may provide a number of advantages over the prior art. For example, as noted above, the efficiency of the unwanted message evaluation process may be increased by prioritizing reports by more highly reliable user/reporters. Speaking generally, this causes resources to be allocated to messages that are more likely to be bad, rather than being wasted on messages that are reported by unreliable user/reporters and are not likely to be bad.

To provide a more specific example, when a reported message containing a potentially malicious file is examined to determine whether it is indeed malicious, it may be sandboxed and executed for a significant amount of time (e.g., 15 minutes) in order to determine the behavior of the file (i.e., whether it is safe or malicious). This execution time may be necessitated in part by the fact that malicious files commonly use the technique of delaying bad behaviors for some amount of time (e.g., 10 minutes) for the specific purpose of evading cyberthreat protection systems. It is therefore necessary to execute these files in the sandboxed environment for a period that is long enough to observe the malicious behaviors. By eliminating or de-prioritizing evaluation of reports from less reliable reporters, the embodiments disclosed herein avoid expending the substantial amount of processing time that would otherwise be required to evaluate the reported messages for malicious behavior.

Another way the present embodiments save computing resources is by reducing the amount of computing time that is necessary to re-evaluate messages that are not immediately identifiable as either malicious or safe. For example, a reliable reporter may report a message that is, in fact, malicious, but is new enough that threat detection systems are not yet trained to recognize the threat. Existing systems will receive a report of the message, examine the message (expending the required computing resources), and will simply determine that the message is not a threat because the system is not yet trained to recognize the threat. Then, since the threat was not recognized, the message may again be reported by the reliable reporter, requiring a re-analysis of the message. This reevaluation may be more extensive than the initial evaluation because the initial evaluation was insufficient to detect the threat. The more extensive evaluation may also be required to ensure that customer trust is maintained. In addition to wasting computing resources on the reevaluation, failure to accurately identify a message as bad delays accurate identification of the message's malicious character and may allow harm resulting from the message's malicious behavior. Further, the failure to identify the threat will almost certainly have introduced inaccuracy into the evaluation of the reporter's reliability, since the reliable reporter's accurate reporting of the malicious message will have been indicated to be inaccurate. This may affect the handling of further reported messages from this reporter, who is deemed to be less reliable despite their accurate reporting.

The present embodiments avoid the wasted resources in this scenario by queueing a reported message that cannot immediately be determined to be either safe or malicious and, after waiting for some predetermined interval, evaluating the message using any updated data or evaluation tools that have become available since the initial evaluation of the message. If the message still cannot be determined to be malicious, it can be deemed safe and the reporter's reliability can be adjusted (e.g., reduced) accordingly. If the message is determined to be malicious, it can be handled appropriately (e.g., it can be added to a list of bad messages that are blocked by a malicious content analytics service to prevent the bad message from being delivered to other recipients) and the reporter can be credited for the accurate reporting of the message, which in turn improves the efficiency of evaluating future messages based on the reporter's reliability.

The present embodiments also enable threat protection systems to function more efficiently and effectively. By focusing resource usage on unwanted messages that are reported by reliable user/reporters, bad messages are more likely to be identified, since time is not wasted evaluating messages that are not likely to be bad (i.e., those reported by unreliable reporters). Once the bad status of an unwanted message is determined, it can be added to a list of bad messages that are blocked by a malicious content analytics service to prevent the bad message from being delivered to other recipients. The faster and more efficient identification of these messages provided by the present embodiments results in an improved malicious content analytics service. As noted above, another advantage of the present embodiments is that when the initial evaluation of a reported message cannot determine whether the message is bad or safe, deferring the update of the reporter's reliability score until delayed reevaluation of the message can be performed results in more accurate tracking of the reporter's reliability. The increased accuracy of the reporter's reliability score in turn results in faster and more efficient evaluation of newly reported messages to determine whether they are bad or safe.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1A:
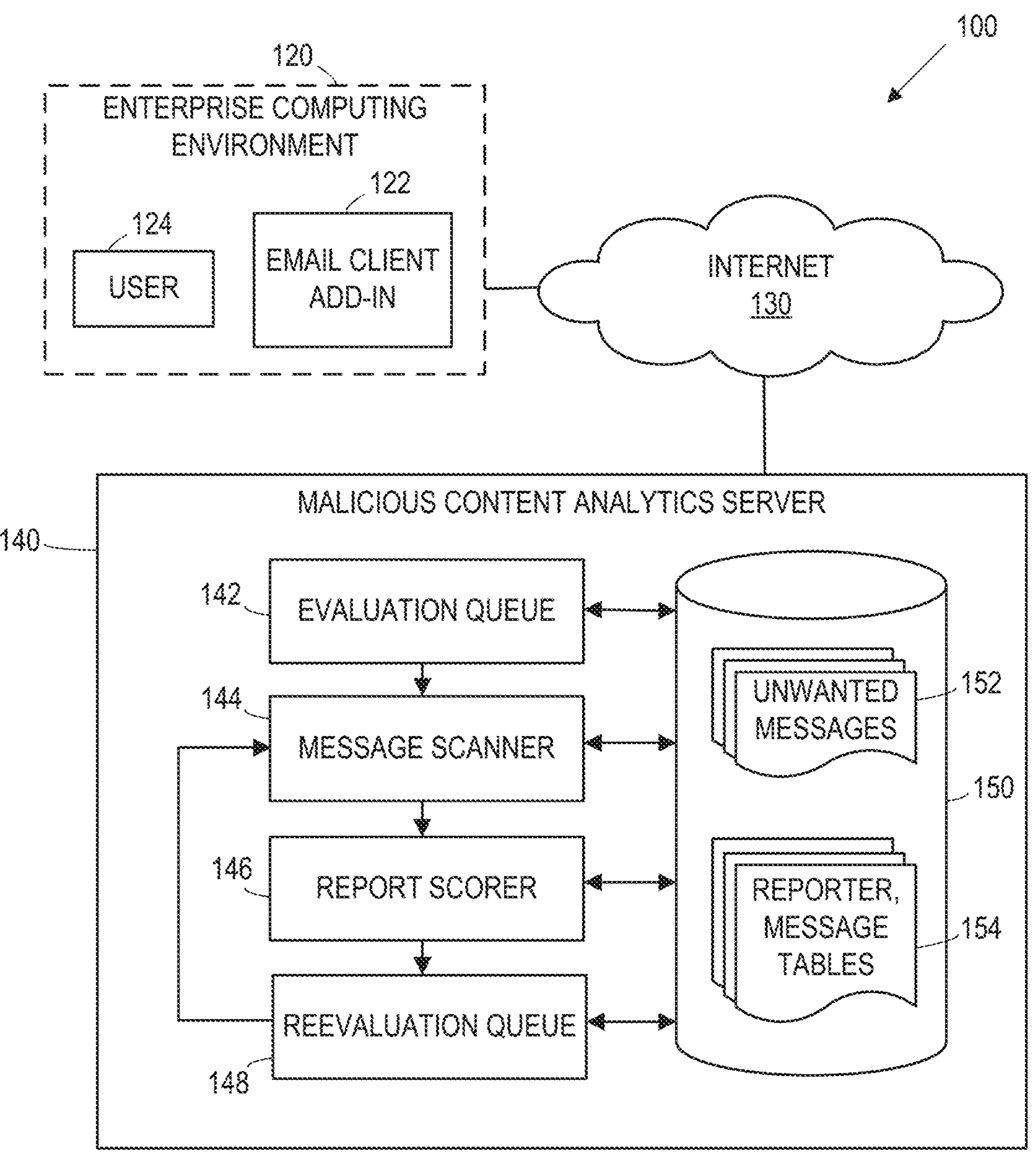
FIG. 1A is a diagram illustrating a system capable of implementing a malicious content analytics service in a network computing environment according to some embodiments.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As noted above, threat protection services may be designed to receive reports of suspicious emails from end-users at the respective customers. While some of the reported messages are actually malicious, many of the reported messages fall into non-malicious categories (e.g., internal mail, bulk mail, etc.) The reporting of non-malicious messages makes it more difficult as a practical matter for analysts (e.g., internal analysts of the customers or the threat protection services) to evaluate all of the messages. The analysts cannot realistically respond to each report because a great deal of the available resources are wasted on the evaluation of messages that are not actionable from a threat perspective. Additionally, it is a challenge to obtain a clear threat verdict (e.g., malicious/non-malicious) on many of the reported messages because they may have already been reported and/or scanned to determine their bad character, but it may have been so recent that the resulting determination (e.g., malicious/non-malicious) is not available for use in the automated evaluation of reported messages. There is therefore a need to be able to assign reputation to users that report suspicious email, and to delineate between users who reliably report only bad messages, and users who are not reliable (i.e., the messages which they report usually are not determined to actually be bad).

The need to prevent delivery of bad emails to users in an enterprise system highlights the need for embodiments of the systems and methods disclosed herein for determining the reliability of users who report unwanted emails. These users may be referred to herein as "reporters." Embodiments disclosed here analyze the performance of reporters with respect to the reporting of unwanted emails and maintain corresponding records, including scores which reflect the reliability of the reporters in identifying bad emails. The reporters' scores may then be used to prioritize processing of reported unwanted emails (e.g., manual review of the emails by analysts), thereby focusing the use of resources on emails that are more likely to be deemed bad and increasing the efficiency of the resource usage.

In some embodiments, a tool is provided on a user's computer to enable the user to select a "report" button to submit a message which is believed to be bad to a malicious content analytics service. The message is scanned by the malicious content analytics service to determine whether the message is bad or not. If the message is identified as bad, the user gets positive "credit" for that submission. This positive credit may be applied to a reliability score that is associated with the user, potentially increasing the score. It should be noted that the credit may be user-configurable, and may be determined in a variety of ways, depending upon the specific implementation scheme. The credit may also vary depending upon factors such as the specific category of bad behavior (e.g., the credit awarded for reporting a malicious message may be greater than the credit awarded for reporting spam).

If the message is not determined to be bad, malicious content analytics service applies a second review to the message to determine whether the message can be affirmatively identified as "safe." This may consist of applying a set of "safe message" rules to the message (for example, if the message is an internal email, it might be deemed "safe"). If the message is determined to be safe, then the report is unreliable. Since the message is not bad, non-positive credit (i.e., negative credit or no credit at all) is awarded to the user who reported the message. As with the positive credit, the non-positive credit may be user-configurable, may be determined in an implementation-specific manner, and the magnitude of the credit may be based on various different factors.

The calculation of the score for each user/reporter is configurable and can involve any reasonable combination of factors, including but not limited to volume of submissions, percentage of correct submissions, recency bias, severity of the threat identified, etc. The score for each user can be updated with each submission, or periodically.

If, on the other hand, the message does not fit any of the "safe" rules, it is tagged as "unknown" and is put into a reevaluation queue. (As used herein, "unknown" refers to messages that have not been determined to be bad and have not been determined to be safe.) After some delay, which may be configurable, the message is reevaluated by the malicious content analytics service. The delay allows the malicious content analytics service to be updated with information that has become available since the message was first reported. This information may be useful to determine whether the message is bad. If the message is determined to be bad based on the updated information in the malicious content analytics service, the message is handled in the same manner as other bad messages, and the user who reported the message receives positive credit in the same manner as if the message had been determined to be bad upon first examination. Thus, a user who correctly identifies a bad message before the malicious content analytics service can do so is not wrongly "dinged" or faulted for reporting the message but is instead given proper credit for identifying a bad message.

It should be noted that there may be multiple unknown messages (which have not been determined to be either bad or safe) in the reevaluation queue. The reevaluation of these unknown messages can be prioritized according to the reporter reputation score of the corresponding user (the user who reported the message). The unknown message with the highest associated reporter reputation score is reevaluated first, then the message with the next-highest reporter reputation score is reevaluated, and so on. As noted above, this results in allocation of resources first to the messages that are most likely to be bad (based on the higher associated reporter reputation scores), and then to messages that are less likely to be bad. It should be noted that the messages which have been reported by users may be prioritized for the initial evaluation as well as the reevaluation. This may allow the system to avoid expending processing resources on messages that are reported by users who have a low likelihood of reporting messages that are actually bad.

It may be helpful to consider embodiments of the present invention in contrast to existing technologies. For example, some existing technologies implement reputation scores for users who report unwanted emails. One existing system is a collaborative network for detecting and filtering spam emails. In this system, reporters receive messages and can provide an indication to the system that one or more of these messages is spam. In other words, each reporter may nominate messages as spam. The system collects these nominations and also identifies the particular reporters that report the messages. The system examines the messages to determine the extent to which the community of users/reporters agree (to a given level of confidence) that particular messages are spam. Those messages that are deemed to be spam are then added to the collaborative system's catalog of spam messages so that they can be filtered out of user's emails. If a reporter has nominated a message that is determined to be spam based on this community agreement, the reporter is awarded points. If a reporter accrues enough points, the reporter is deemed to be a "trusted" reporter. In determining whether there is community agreement that a particular message is spam, the reports of more trusted reporters may be given greater weight than the reports of less trusted reporters.

While this collaborative system uses a scoring scheme to identify whether a reporter is trusted, the collaborative system differs from the embodiments disclosed herein in that the spam/non-spam character of the messages is based on agreement between the users/reporters rather than using an analytics service (or expert reviewer) that can objectively determine the spam (or otherwise malicious) character of the message. Thus, the determination of whether or not a message is spam (and whether or not a reporter accrues points toward a "trusted" status) in the collaborative system depends on how the users feel about the message. In the present embodiments, the character of the message is determined based on the objective evaluation of the analytics service rather than the opinions of users. In the present embodiments, contrary to the collaborative system the reporter scores do not even come into play until after the messages have been evaluated to determine whether they are bad or safe. The reporter scores are used in the present embodiments are updated based on previously evaluated messages and are used only after the messages have been evaluated and have been determined to be unknown (i.e., neither bad nor safe). Even then, the reporter scores are used to prioritize and determine the order in which the unknown messages will be reevaluated by the analytics service—the messages are not evaluated based on the reporter scores. The use of the reporter scores optimizes the allocation of resources in the reevaluation of the messages by giving priority to messages reported by the most reliable reporters.

Another existing technology is designed to use collaborative techniques to detect phishing attacks. An example of this technology is described in U.S. Pat. No. 10,819,744. In this system, individuals are subjected to simulated phishing attacks, and their responses to each simulated attack (fell victim to the attack, ignored attack, reported attack) are recorded. The responses are used to generate trustworthiness scores for the users, where the scores indicate the likelihood that the users will fall victim to further phishing attacks (simulated or real). Then, when users flag what they believe to be phishing attacks, the system uses their respective trustworthiness scores to determine how much weight to accord to their responses (e.g., the system may weigh the responses of more trustworthy users more heavily than those of less trustworthy users, or it may consider the responses of more trustworthy users and ignore those of less trustworthy users).

This collaborative system, like the previous example, implements a reporter scoring scheme representative of the trustworthiness of each user/reporter. The reporter scores are used in a manner similar to the previously described collaborative system in that this system determines whether or not to classify a message as a real phishing attack based on the trustworthiness scores of the users who report the message. This is different from the embodiments of the present invention for reasons similar to those noted above for the first collaborative system. For instance, the present embodiments do not use the reporter scores to determine whether the reported messages are bad (e.g., phishing attacks)—this determination is instead made by an analytics service without regard to the reporter scores. Viewed another way, the collaborative system determines the character of the message (i.e., whether it is a phishing attack) based on the reporter scores, while the present embodiments do the opposite—they determine the reporter scores based on the previously determined character of the reported messages. Another difference is that, in the present embodiments, if the character of a reported message cannot initially be determined by the analytics service, the message is put in a reevaluation queue and is held for a period of time before being reevaluated by the analytics service—something that is not done in the collaborative system. The reporter scores are used in the present embodiments to determine the order in which the analytics service acts on the messages in the reevaluation queue, but they do not affect the outcome of the reevaluation—they simply reallocate resources to give priority to the messages reported by the more reliable reporters.

Referring to FIG. 1A, a diagram illustrating a system capable of implementing a malicious content analytics service in a network computing environment according to some embodiments is shown. The illustrated structure of the system is intended merely to serve as an example, and alternative embodiments that have different structures may also be suitable to implement the content analytics techniques disclosed herein.

In this embodiment, a content analytics system 100 includes a malicious content analytics server 140 which is communicatively connected to an enterprise computing environment 120 via a network 130 such as the Internet. An add-in 122 to an email client in enterprise computing environment 120 allows user 124 to report potentially bad email messages to malicious content analytics server 140. In this embodiment, when user 124 identifies an unwanted (suspicious) email, the user simply selects the email and clicks a button provided by add-in 122, which triggers the reporting of the email to malicious content analytics server 140.

When reporting of the selected email is triggered by add-in 122, the email is forwarded to an evaluation queue 142. The unwanted email 152 is stored in a data store of the malicious content analytics server. The forwarding of the unwanted message to the evaluation queue also triggers the logging of the report. For instance, the malicious content analytics server may identify the user/reporter in a reporter identity table, adding the reporter to the table if it does not already contain an entry for the user/reporter. The server may also identify or insert an entry in a message disposition table and identify or insert an entry for the user/reporter in a reporter score table.

The queued unwanted message is retrieved from evaluation queue 142 and is evaluated by message scanner 144. Message scanner 144 may consist of various components for analyzing the message to determine whether or not it is bad and should have been blocked. Message scanner component 144 may utilize existing techniques for determining whether the reported message is bad. These techniques will not be described in detail here, as the specific techniques which are implemented are not essential to the invention. In addition to determining whether the unwanted message is bad, message scanner component 144 is configured to determine whether the message is safe. This may involve, for example, applying a set of "safe" rules to the unwanted message to determine whether or not the message is safe. As in the case of determining whether the message is bad, this may involve various different techniques which will not be described in detail here.

The results of the evaluation performed by message scanner 144 are provided to a report scorer 146 of the malicious content analytics server. These results are used by report scorer 146 to update a score associated with the user/reporter who reported the unwanted message. The user/reporter's score is maintained in a table 154 in data store 150. If the results of the evaluation by message scanner 144 indicate that the unwanted message is bad, the user/reporter correctly identified the unwanted message as bad (e.g., suspicious/malicious), so report scorer 146 updates the reporter score of the corresponding user/reporter to reflect a positive credit. If, on the other hand, the results of the evaluation indicate that the unwanted message is safe, the user/reporter incorrectly identified the unwanted message as bad, so report scorer may update the reporter score accordingly. In some embodiments, the reporter score may be updated to reflect a negative credit, while in other embodiments, the reporter score may simply reflect that no credit is awarded for the incorrect report. If the unwanted message is not determined to be bad or safe, it is forwarded to a reevaluation queue 148 and after a waiting period is returned to message scanner 144 for reevaluation.

Figure 1B:
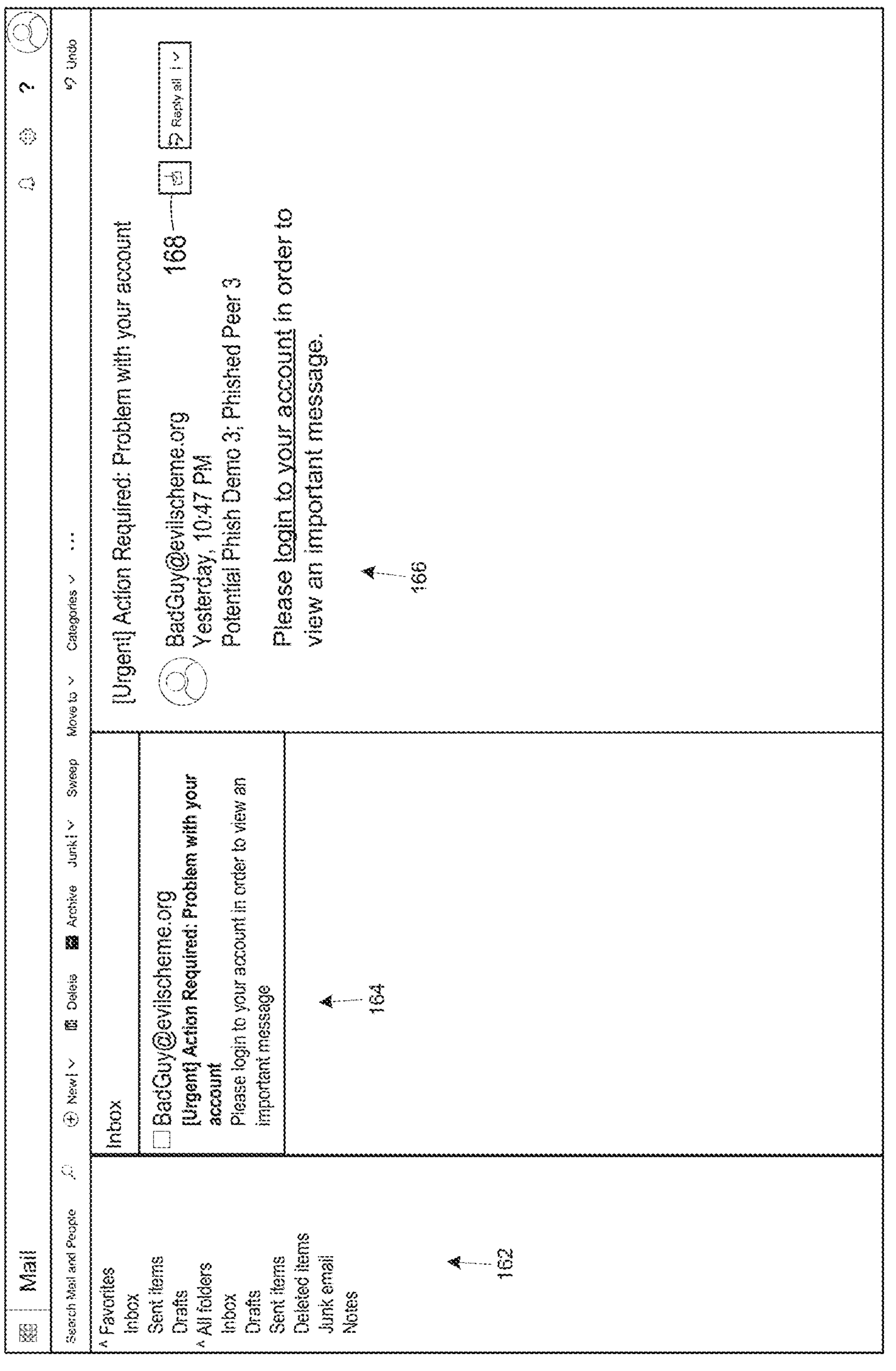
FIG. 1B is a diagram illustrating an example screenshot of a graphical user interface for an email client using a reporting add-in according to some embodiments.

Referring to FIG. 1B, an example screenshot of a graphical user interface for an email client using add-in 122 is shown. The user/reporter may use any suitable email client that includes the reporting add-in which triggers the reporting of the email to malicious content analytics server. As depicted in this example, the interface has typical components, including a pane in which a set of mail folders 162 is displayed, a pane in which the email messages 164 of a selected one of the folders are displayed, and a preview pane in which the content 166 of a selected message is displayed. When the user/reporter has selected an email and is viewing the content of the email, the user/reporter may determine that the message is unwanted (e.g., the user/reporter may believe the message is a phishing attack). If this is the case, the user/reporter simply clicks a "report message" button 168.

Figure 2A:
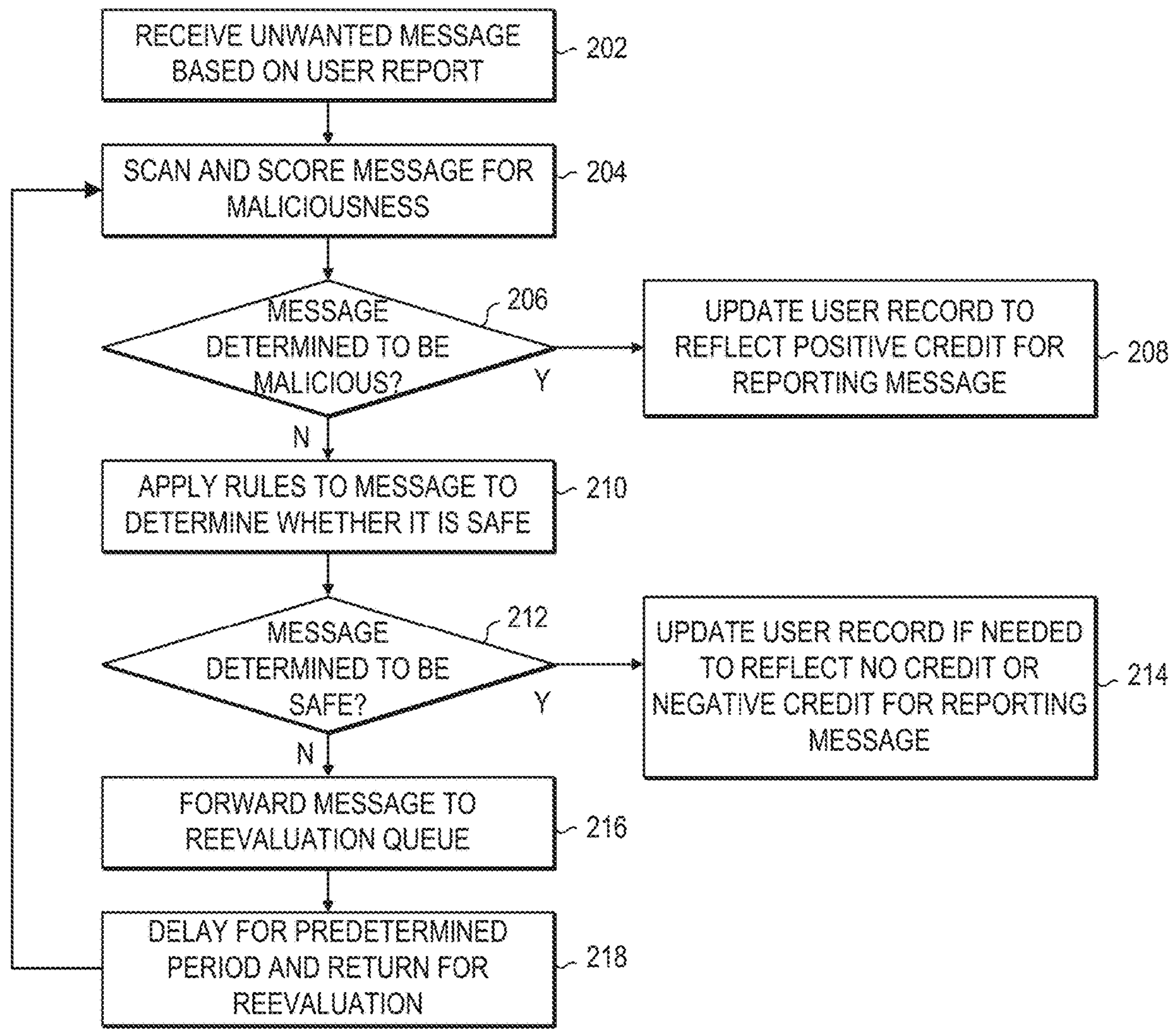
FIG. 2A is a flow diagram illustrating a method for scoring a user/reporter based on a report of an unwanted message in accordance with some embodiments.

Referring to FIG. 2A, a flow diagram illustrating a method for scoring a user/reporter based on a report of an unwanted message in accordance with some embodiments is shown. In this method, a report of an unwanted message is received (step 202). The unwanted message is provided to the malicious content analytics service, and is scanned to determine whether or not it is bad (step 204). In some embodiments, only a portion of reported unwanted messages are scanned, as will be discussed below in connection with FIG. 2B.

The bad character of the unwanted message may be determined in a binary fashion, or the message may be assigned a score corresponding to a level or category of bad behavior, depending upon the particular implementation. The scanning of the message may be accomplished in various ways, and may use various different techniques and procedures, depending upon the system in which the scanning is implemented. The scanning may utilize conventional techniques which are known in the art, and the specific techniques will not be described in detail here, as these details are not essential to the invention.

It is worth noting, however, that the scanning techniques used to determine whether or not a message is bad all require computer processing resources. As previously noted, potentially malicious files are commonly executed in a sandboxed environment in order to safely determine the behaviors of the files. Because malicious files sometimes employ the technique of delaying malicious behaviors for some interval after execution of the files is initiated, it may be necessary to execute the files for some extended amount of time simply to allow the files to exhibit their behaviors. For example, if it is observed that malicious files sometimes delay bad behaviors for 10 minutes, sandboxed files may need to be executed for 15 minutes to try to ensure that these bad behaviors are observed. Because the evaluation of reported messages for bad behaviors (including the sandboxed execution of files) may require substantial computing resources, the ability to avoid or de-prioritize scanning messages that are reported by unreliable reporters can significantly increase the efficiency of threat protection systems implementing embodiments of the present invention.

At step 206, if the unwanted message has been determined to be bad, a record corresponding to the user/reporter is updated to reflect a positive credit for reporting the unwanted message (step 208). The magnitude of the credit may vary, depending upon the type of bad behavior associated with the unwanted message, the number of messages reported by the user/reporter, or various other factors. The specific implementation of the credit, the score, and the manner of updating the score will be implementation-specific.

If, at step 206, the unwanted message has not been determined to be bad, it is determined whether or not the message is safe (step 210). This may involve applying a set of "safe" rules to the unwanted message. For example, is the unwanted message an internal email, an email from a whitelisted/safelisted domain, etc. The safe rules may be user-configurable. If the unwanted email is determined at step 212 to be safe, the user record corresponding to the user/reporter of the unwanted message is updated accordingly (step 214). Since the unwanted message was determined to be safe, the report of the user/reporter is considered to be inaccurate, so the user/reporter's score may be adjusted by a negative credit to reflect the inaccuracy. As with the positive credit for an accurate report, the magnitude and implementation of the negative credit may vary depending upon number of factors, and the specific implementation of the negative credit (as well as the scoring methodology may be different from one embodiment to another. In some embodiments, a zero credit may be assigned to the report, so that the user/reporter's score may not necessarily decrease as a result of the report. The user/reporter's score may, however, be updated to reflect the fact that the unwanted message was reported (e.g., the user/reporter's score may include a component indicating the number of messages reported).

If, at step 212, the unwanted message has not been determined to be safe, then the message is "unknown" (i.e., not known to be either bad or safe), so the message is forwarded to a reevaluation queue (step 216). The unknown message is maintained in the reevaluation queue for at least some predetermined period of time, and it is then reevaluated to determine whether it is bad or safe (step 218). This reevaluation involves the same procedure as the initial evaluation (steps 204-214). Because, however, the reevaluation of the unknown message is delayed for some period of time, the system performing the evaluation/reevaluation will have had time to be updated with recently identified threats and/or safe rules. Furthermore, the unknown messages in the reevaluation queue in this embodiment are prioritized according to the reliability scores of the corresponding users/reporters so that resources used in the reevaluation of the messages are allocated first to the messages that are more likely to be bad (since they were reported by users who have proven to be more reliable in the identification of bad messages). The resources are therefore more efficiently allocated than in prior systems.

Thus, for example, a user/reporter may report an unwanted message that is actually bad, but the report may be received by the system before the threat contained in the message has been identified by the system as bad. Consequently, when the report of the unwanted message is received, the system will not be able to identify it as bad. The unwanted message will therefore be processed to determine whether it is safe, and when it is not found to be safe, it will be forwarded to the reevaluation queue. At this point, despite having accurately identified the unwanted message as being bad, the user/reporter's reliability score will not reflect this accurate report because the system could not corroborate it (i.e. determine it to be bad). After allowing some time for the system to be updated, however, the message can be reevaluated according to the updated threat information, and can verify that the message is, indeed, bad. At this point, the user/reporter's score can be updated and credited to reflect the fact that the user/reporter's report of the unwanted message was accurate.

As noted above, the computing resources that are available to scan reported unwanted messages are limited, so it the present embodiments are designed to enable those limited resources to be focused on the messages that are most likely to actually be bad, i.e., the messages that are reported by users/reporters that have the highest reliability scores. In some cases, this means that only a subset of the reported messages are scanned to determine whether they are bad. The remainder are not scanned, so the resources that would have been required for these messages are saved.

Figure 2B:
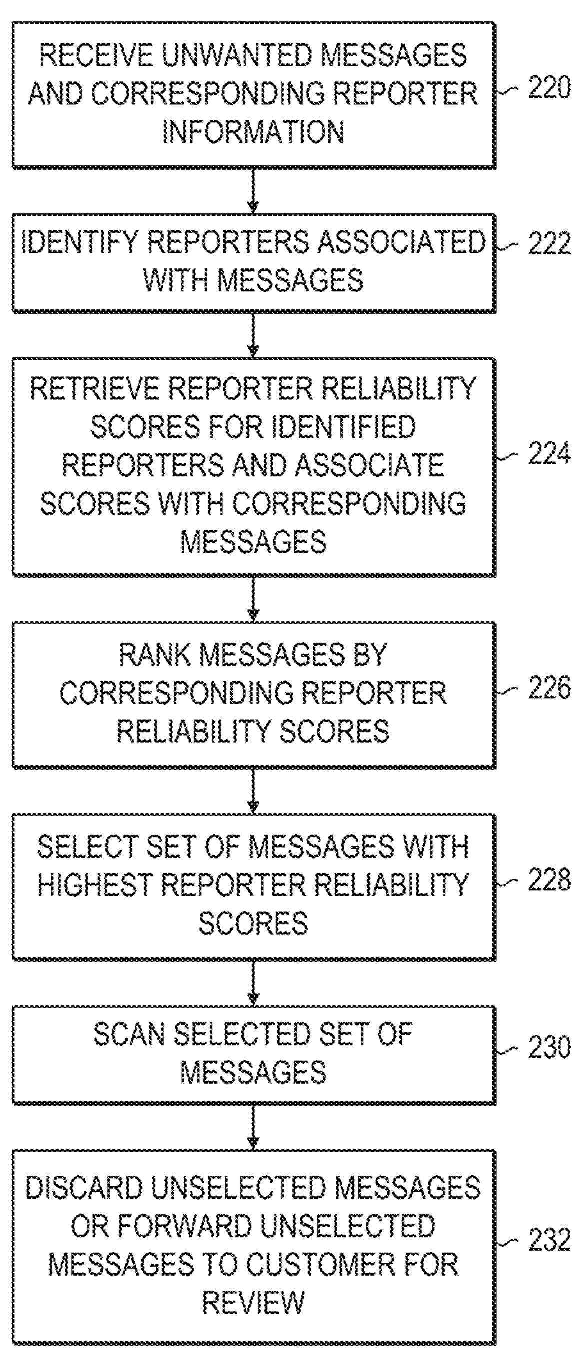
FIG. 2B is a flow diagram illustrating a method for using user/reporter reliability scores to select a set of unwanted messages to be scanned in accordance with some embodiments.

Referring to FIG. 2B, a flow diagram is shown to illustrate an example method for selecting a subset of the reported unwanted messages to be scanned. At step 220, the unwanted messages are received. The messages may be received as a group, or they may be received over a period of time. Each of the received messages is associated with information that is used to identify the corresponding user/reporter who reported the message (step 222). The identity of each user/reporter associated with the received messages is then used to retrieve a corresponding reliability score associated with the user/reporter (step 224). This score for each user/reporter is then associated with the message reported by that user/reporter. Each of the set of received unwanted messages is then ranked according to the user/reporter reliability score that is associated with the message (step 226). The messages with the highest rankings are then selected (step 228) and scanned (step 230). The messages may be selected as a set (e.g., with the top 10% of the messages, or the top 100 messages being selected), or the messages may be selected one at a time, as resources become available to scan them (e.g., with each successive message being taken from the top of the remaining ranked messages). Messages that are not selected to be scanned may, for example, be discarded periodically or they may be forwarded to the customers whose associated users reported the messages so that the messages can be scanned or otherwise evaluated by the customers if desired (step 232).

Figure 3:
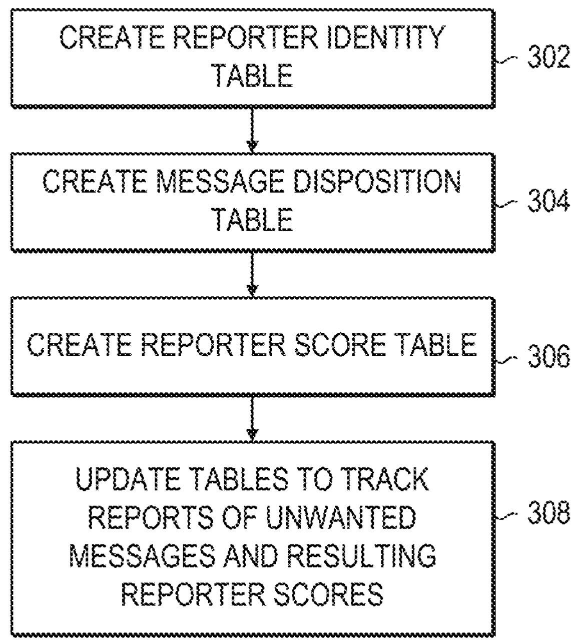
FIG. 3 is a flow diagram illustrating a method for creating and maintaining tables for storing information associated with user/reporter scoring in accordance with some embodiments.

Referring to FIG. 3, a flow diagram illustrating a method for creating and maintaining tables for storing information associated with user/reporter scoring in accordance with some embodiments is shown. In this embodiment, three tables are created and maintained: a reporter identity table, a message disposition table, and a reporter score table. At step 302, the reporter identity table is created. This table may, for example, be created and indexed using code that has a sequence as follows:

```
if a reporter identity table does not already exist:
   create reporter identity table
   define fields for report ID, reporter ID, message ID
   define fields for timestamps (created, updated)
if an index does not already exist:
   create index (e.g., on timestamps).
```

At step 304, the message disposition table is created. This may be accomplished in one embodiment using code that has a sequence as follows:

```
if a message disposition table does not already exist:
   create message disposition table
   define fields for message ID, disposition (initial, final)
   define fields for timestamps (created, updated)
if an index does not already exist:
   create index (e.g., on timestamps).
```

At step 306, the reporter score table is created. This table may be created in one embodiment using code that has a sequence as follows:

```
if a reporter score table does not already exist:
   create reporter score table
   define fields for report ID, reporter ID, score (overall, per category)
   define fields for timestamps (last updated).
```

The table may then be altered to add a primary key constraint and create an index using code that has a sequence as follows:

```
modify reporter score table to add primary key constraint (report ID,
reporter ID)
if an index does not already exist:
   create index for reporter score table (e.g., on timestamps).
```

After the tables have been created, the tables are updated to track information relating to the unwanted messages reported by users/reporters and the reliability scores corresponding to each of the users/reporters (step 308).

Figure 4:
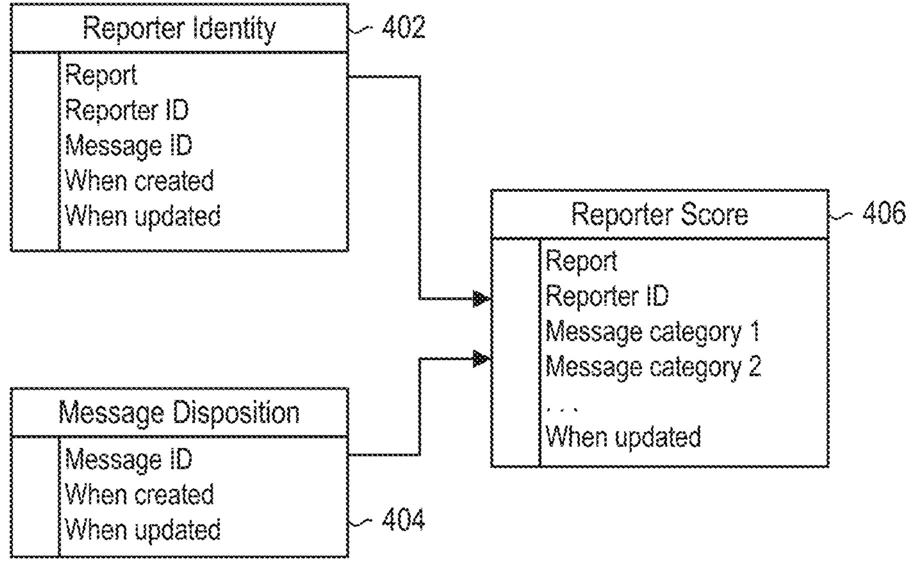
FIG. 4 is a diagram illustrating the relationship between reporter identity, message disposition and reporter score tables in accordance with some embodiments.

Referring to FIG. 4, a diagram illustrating the relationship between the reporter identity table (402), message disposition table (404) and reporter score table (406) in some embodiments is shown. As depicted in this figure, the reporter identity table (402) includes fields for the report, an identifier of the user/reporter, and an identifier of the unwanted message. One or more of these fields may be used as primary keys for the table. The reporter identity table may also include fields for the time of initial creation of the report record and the time of the last update of the report record.

The message disposition table (404) includes fields for the identifier of the unwanted message, which may be used as a primary key for the table. The table may also include fields for the time of initial creation of the message disposition record and the time of the last update of the message disposition record.

As depicted in FIG. 4, the information contained in the records of the reporter identity table (402) and message disposition table (404) are used to generate the records of the reporter score table (406). The report field and the user/reporter identifier field are included in the reporter score table. Additionally, the reporter score table may include fields for multiple bad message categories (e.g., malicious, suspicious, bulk, low_risk, spam and unknown).

Figure 5A:
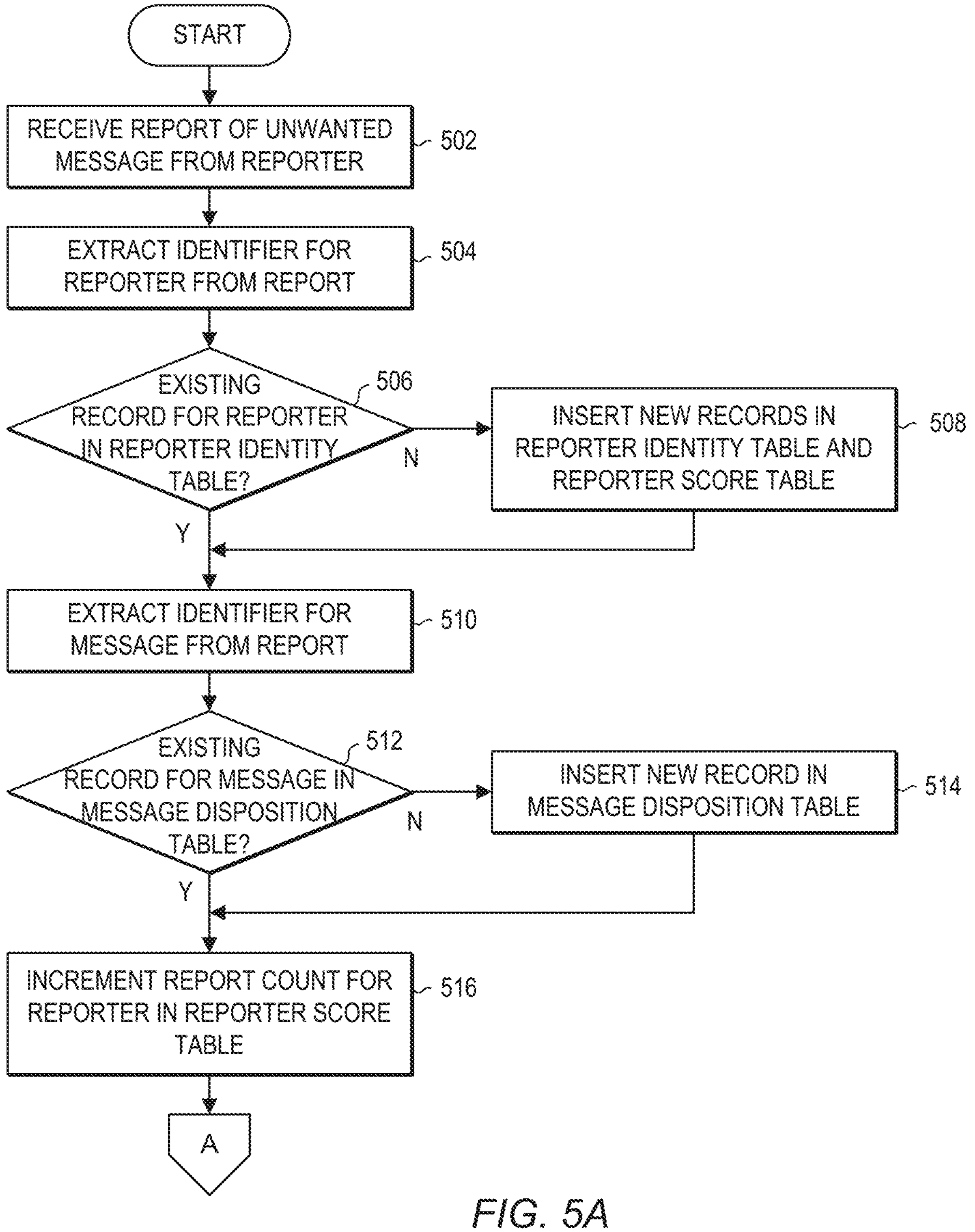
FIGS. 5A and 5B are a flow diagram illustrating a method for generating/updating the reliability score for a user/reporter in accordance with some embodiments.
Figure 5B:
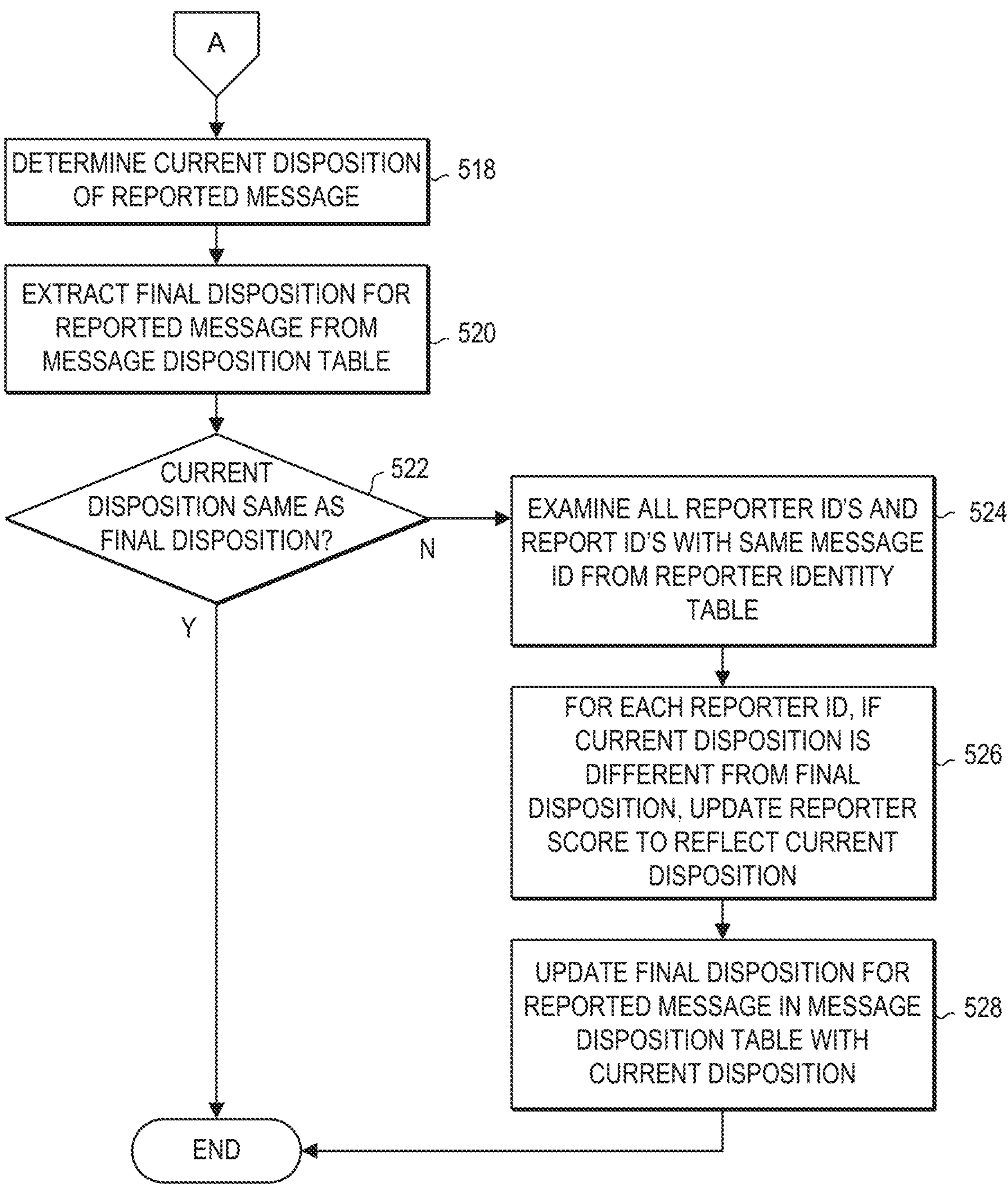

Referring to FIGS. 5A and 5B, a flow diagram illustrating a method for generating/updating the reliability score for a user/reporter in accordance with some embodiments is shown. The initial steps of the method are shown in FIG. 5A, and the method is continued in FIG. 5B.

As depicted in this figure, the method begins with receipt of a report from a particular user/reporter of an unwanted message (step 502). At step 504, information identifying the user/reporter is extracted from the report. It is then determined whether the reporter identity table already contains a record corresponding to the identified user/reporter (step 506). If the reporter identity table does not already contain a record for this user/reporter, a new record for the user/reporter is inserted into the reporter identity table, as well as the reporter score table (step 508). In one embodiment, the new record may be inserted into the table and a record selected using code that has a sequence such as:

```
if triplet of report ID, reporter ID, message ID does not already exist
in reporter ID table:
   insert triplet into reporter ID table.
A record (e.g., the first non-null record in the table) can then be
selected from the table.
```

The method then proceeds to step 510, in which information identifying the unwanted message is extracted from the report. It is then determined whether there is already a record in the message disposition table for the particular unwanted message identified by the report (step 512). If there is not already a record corresponding to the identified message, a new record is inserted into the message disposition table (step 514). In one embodiment, the new record may be inserted into the table using code that has a sequence such as:

```
if message ID does not already exist in message disposition table:
   insert message ID into message ID table
The record is then available to be selected from the table.
```

The reporter score table is then updated to increment a counter of the number of reports that have been reported by the corresponding user/reporter (step 516).

Referring to FIG. 5B, the current disposition of the reported unwanted message is then determined (step 518). The message disposition table is then accessed to obtain the final disposition of the reported unwanted message (step 520), and it is determined whether the current disposition for the message is the same as the final disposition obtained from the message disposition table (step 522). If at step 522 the current disposition is the same as the previously recorded final disposition, there is no need to update the reporter score table, so the method terminates.

If, on the other hand, the current disposition of the unwanted message is not the same as the previously recorded final disposition for the message, the reporter score table needs to be updated to reflect the changed disposition, so the method proceeds to step 524. Because the unwanted message may have been reported by multiple users/reporters, the records for each of these users/reporters must be updated. Consequently, the users/reporters who are associated with the reported unwanted message are identified, and these users/reporters and the corresponding identifiers of reports associated with the unwanted message are retrieved from the tables. For each retrieved reporter identifier, the corresponding reporter score is updated to reflect the change from the previously recorded final disposition of the unwanted message to the current disposition (step 526). Additionally, the final disposition of the reported unwanted message is updated to the current disposition in the message disposition table (step 528).

The user reporter scores may be updated using code that follows a sequence such as, for example:

```
for each reporter ID,
  determine the messages reported and
  determine the final disposition for each reported message,
  count the message dispositions (e.g., by category)
order and insert the reporter disposition counts into a temporary file
for each reporter ID in the temporary file
  if the reporter ID doesn't exist in the reporter score table, insert the
  reporter ID and message counts in the table
  if the reporter ID exists in the reporter score table, add the message
  counts in the temporary file to the existing counts in the table
  timestamp the updated records.
```

Figure 6:
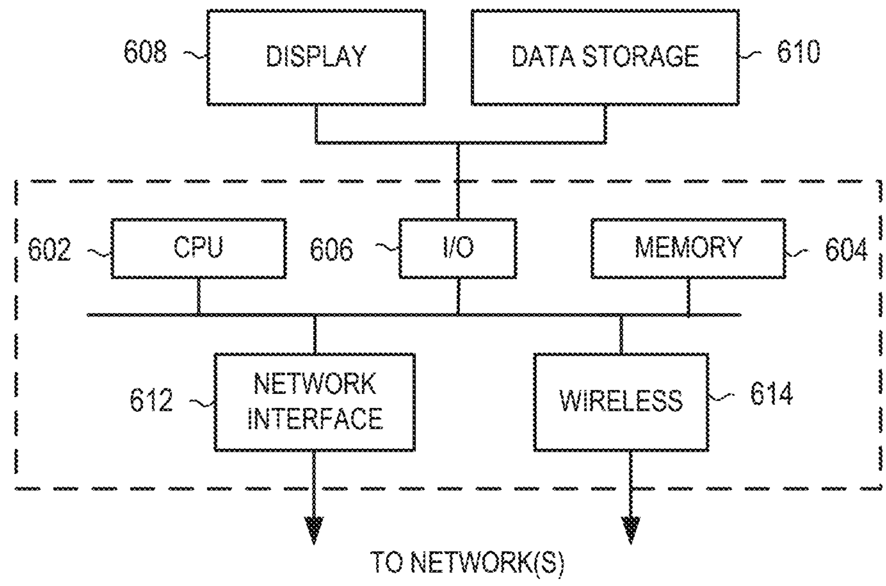
FIG. 6 is a diagram illustrating a computer system in which some embodiments may be implemented.

Embodiments discussed herein can be implemented in a computer communicatively coupled to a network (for example, the Internet), another computer, or in a standalone computer. As illustrated in FIG. 6, a suitable computer can include a central processing unit ("CPU" 602), a computer memory (604) such as a read-only memory ("ROM"), random access memory ("RAM") or hard drive ("HD"), and one or more input/output ("I/O") devices 606). The I/O devices, which can be coupled to a display (608) and a data storage device (610), can include a keyboard, monitor, printer, electronic pointing device (for example, mouse, trackball, stylus, touch pad, etc.), or the like. In embodiments of the invention, the computer has a network interface (612) and a wireless component (614) for communicating with other computing devices over various types of networks.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present), and B is false (or not present), A is false (or not present), and B is true (or present), and both A and B are true (or present). As used herein, including the accompanying appendix, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendix, the meaning of "in" includes "in" and "on" unless the context clearly dictates otherwise.

It should be understood that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure. It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

What is claimed is:

1. A method comprising:

receiving a report of a first unwanted message, the report identifying the first unwanted message stored in an evaluation queue of a malicious content analytics server and a corresponding first reporter;

performing a message evaluation including:

scanning, from the evaluation queue and by the malicious content analytics server, the first unwanted message and thereby determining whether the first unwanted message is bad, safe, or neither bad nor safe, if the first unwanted message is determined to be bad by the malicious content analytics server, updating a reporting record corresponding to the first reporter to reflect a positive credit to a corresponding reporter score, wherein the reporting record is stored in a table of a data store, if the first unwanted message is determined to be safe by the malicious content analytics server, updating the reporting record corresponding to the first reporter to reflect a non-positive credit to the corresponding reporter score, and if the first unwanted message is determined to be neither bad nor safe by the malicious content analytics server, deferring updating the reporting record corresponding to the first reporter and storing the first unwanted message as a stored digital object in a reevaluation queue of a first memory;

in response to entering the first unwanted message in the reevaluation queue, delaying for a waiting period and, after the waiting period has elapsed, performing a message reevaluation, by the malicious content analytics server performing automated scanning, on the first unwanted message in the reevaluation queue, wherein the reevaluation queue contains a plurality of unwanted messages including the first unwanted message, each of the plurality of unwanted messages comprising a stored digital object having a corresponding reporter, wherein the plurality of unwanted messages are dynamically reprioritized for the message reevaluation to allocate server resources according to dynamically maintained trust metrics comprising reporter scores of the corresponding reporters.

2. The method of claim 1, wherein a first subset of the plurality of unwanted messages including the first unwanted message having higher priorities undergoes a corresponding message evaluation, and wherein a second subset of the plurality of unwanted messages having lower priorities is unevaluated.

3. The method of claim 2, wherein reevaluating the plurality of unwanted messages further comprises reevaluating a highest priority message of the plurality of unwanted messages before evaluating any messages of the plurality of unwanted messages having priorities lower than the highest priority.

4. The method of claim 1, wherein when performing the message reevaluation on the first unwanted message in the reevaluation queue results in a determination that the first unwanted message is either bad or safe, updating the record corresponding to the first reporter to reflect a corresponding credit to the corresponding reporter score.

5. The method of claim 4, further comprising determining whether the first unwanted message has been reported by one or more additional reporters and updating reporting records corresponding to the additional reporters to reflect corresponding credits to reporter scores corresponding to the additional reporters.

6. The method of claim 1, further comprising maintaining a reporter table, the reporter table containing a record for the report of the first unwanted message, the record including a reporter identifier corresponding to a reporter who reported the first unwanted message, and a message identifier corresponding to the first unwanted message.

7. The method of claim 1, further comprising maintaining a message disposition table, the message disposition table containing a record for the first unwanted message, the record including a message identifier corresponding to the first unwanted message and a disposition of the first unwanted message.

8. The method of claim 1, wherein the reporting record corresponding to the first reporter comprises a reporter score table, the reporter score table containing a record for a reporter who reported the first unwanted message, the record including a reporter identifier corresponding to a reporter who reported the first unwanted message and a reliability score indicating a reliability of the reporter, the reporting record further including an indicator of a number of reported unwanted messages reported by the reporter.

9. The method of claim 1, wherein during the performing of the message reevaluation, in response to determining that an aging interval has elapsed since receiving the report of the first unwanted message, discarding the unwanted message.

10. The method of claim 1, wherein determining that the first unwanted message is bad comprises determining that the first unwanted message is associated with one of a plurality of categories, the plurality of categories of bad behavior comprising at least: malicious; suspicious; bulk; low-risk, and spam.

11. The method of claim 10, further comprising maintaining a weighting factor corresponding to each of the plurality of categories, wherein the positive credit is generated based on the determined one of the plurality of categories and the corresponding weighting factor.

12. A system comprising:

a processor coupled to a memory that stores one or more instructions, the instructions executable by the processor to perform:

receiving a report of a first unwanted message, the report identifying the first unwanted message stored in an evaluation queue of a malicious content analytics server and a corresponding first reporter;

performing a message evaluation including:

scanning, from the evaluation queue and by the malicious content analytics server, the first unwanted message and thereby determining whether the first unwanted message is bad, safe, or neither bad nor safe, if the first unwanted message is determined to be bad by the malicious content analytics server, updating a reporting record corresponding to the first reporter to reflect a positive credit to a corresponding reporter score, wherein the reporting record is stored in a table of a data store, and if the first unwanted message is determined to be safe by the malicious content analytics server, updating the reporting record corresponding to the first reporter to reflect a non-positive credit to the corresponding reporter score, and if the first unwanted message is determined to be neither bad nor safe by the malicious content analytics server, storing the first unwanted message as a stored digital object in a reevaluation queue of a first memory;

in response to entering the first unwanted message in the reevaluation queue, delaying for a waiting period and, after the waiting period has elapsed, performing a message reevaluation by the malicious content analytics server performing automated scanning, on the first unwanted message in the reevaluation queue, wherein the reevaluation queue contains a plurality of unwanted messages including the first unwanted message, each of the plurality of unwanted messages comprising a stored digital object having a corresponding reporter, wherein the plurality of unwanted messages are dynamically reprioritized for the message reevaluation to allocate server resources according to dynamically maintained trust metrics comprising reporter scores of the corresponding reporters.

13. The system of claim 12, wherein when performing the message reevaluation on the first unwanted message in the reevaluation queue results in a determination that the first unwanted message is either bad or safe, updating the reporting record corresponding to the first reporter to reflect a corresponding credit to the corresponding reporter score.

14. The system of claim 12, wherein the instructions are further executable by the processor to perform: performing, on a first subset of the plurality of unwanted messages including the first unwanted message having higher priorities, a corresponding message evaluation; and not evaluating a second subset of the plurality of unwanted messages having lower priorities.

15. The system of claim 12, wherein one of the plurality of the unwanted messages having a highest priority is reevaluated before ones of the plurality of the unwanted messages having lower priorities are reevaluated.

16. A computer program product comprising a non-transitory computer-readable medium storing instructions executable by one or more processors to perform:

receiving a report of a first unwanted message, the report identifying the first unwanted message stored in an evaluation queue of a malicious content analytics server and a corresponding first reporter;

performing a message evaluation including:

scanning, from the evaluation queue and by the malicious content analytics server, the first unwanted message and thereby determining whether the first unwanted message is bad, safe, or neither bad nor safe, if the first unwanted message is determined to be bad by the malicious content analytics server, updating a reporting record corresponding to the first reporter to reflect a positive credit to a corresponding reporter score, wherein the reporting record is stored in a table of a data store, if the first unwanted message is determined to be safe by the malicious content analytics server, updating the reporting record corresponding to the first reporter to reflect a non-positive credit to the corresponding reporter score, and if the first unwanted message is determined to be neither bad nor safe by the malicious content analytics server, storing the first unwanted message as a stored digital object in a reevaluation queue of a first memory;

in response to entering the first unwanted message in the reevaluation queue, delaying for a waiting period and, after the waiting period has elapsed, performing a message reevaluation, by the malicious content analytics server performing automated scanning, on the first unwanted message in the reevaluation queue, wherein the reevaluation queue contains a plurality of unwanted messages including the first unwanted message, each of the plurality of unwanted messages comprising a stored digital object having a corresponding reporter, wherein the plurality of unwanted messages are dynamically reprioritized for the message reevaluation to allocate server resources according to dynamically maintained trust metrics comprising reporter scores of the corresponding reporters.

17. The computer program product of claim 16, wherein when performing the message reevaluation on the first unwanted message in the reevaluation queue results in a determination that the first unwanted message is either bad or safe, updating the reporting record corresponding to the first reporter to reflect a corresponding credit to the corresponding reporter score.

18. The computer program product of claim 16, wherein the instructions are further executable by the processor to perform: performing, on a first subset of the plurality of unwanted messages including the first unwanted message having higher priorities, a corresponding message evaluation; and not evaluating a second subset of the plurality of unwanted messages having lower priorities.

19. The computer program product of claim 16, wherein one of the plurality of the unwanted messages having a highest priority is reevaluated before ones of the plurality of the unwanted messages having lower priorities are reevaluated.

* * * * *